(No Model.)
W. G. LOWRIE.
AUTOMATIC CIRCUIT BREAKER.
No. 593,481. Patented Nov. 9, 1897.
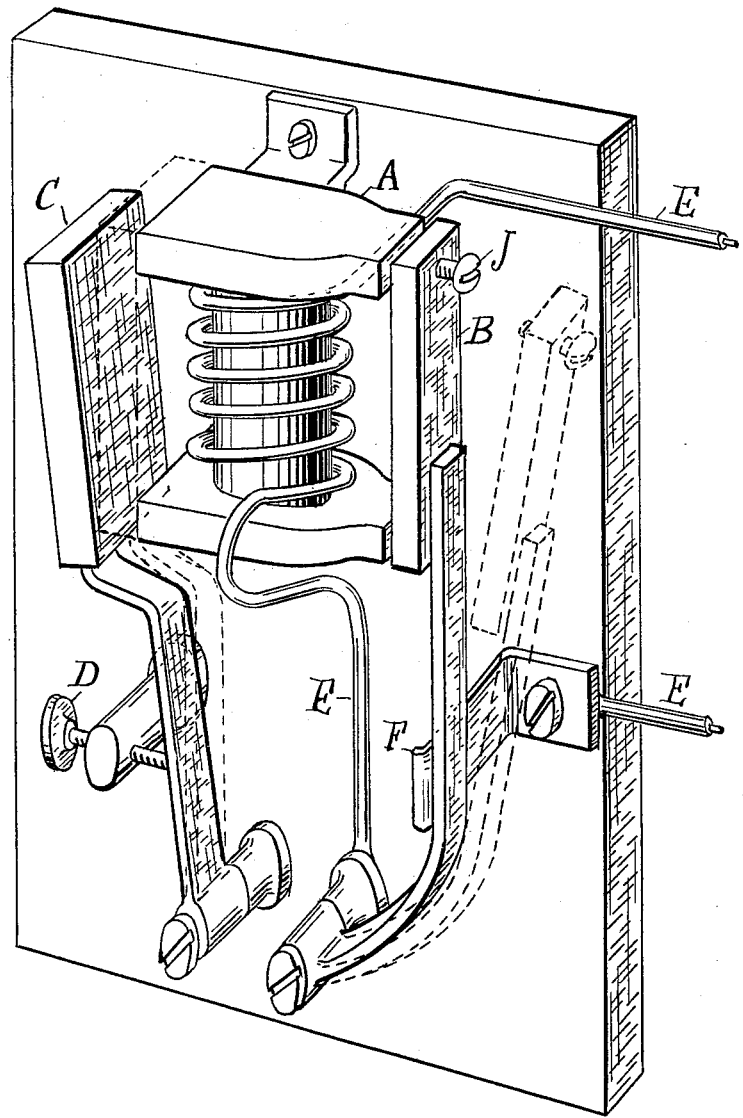
Witnesses:
Samuel W. Balch
Frank J Mather
Inventor,
William Grant Lowrie,
By Thomas Ewing, Jr.,
Attorney

UNITED STATES PATENT OFFICE.

WILLIAM G. LOWRIE, OF NEWARK, NEW JERSEY, ASSIGNOR TO THE CROCKER-WHEELER ELECTRIC COMPANY, OF NEW JERSEY.

AUTOMATIC CIRCUIT-BREAKER.

SPECIFICATION forming part of Letters Patent No. 593,481, dated November 9, 1897.

Application filed April 24, 1897. Serial No. 633,641. (No model.)

*To all whom it may concern:*

Be it known that I, WILLIAM GRANT LOWRIE, a subject of the Queen of Great Britain, residing at Newark, in the county of Essex and State of New Jersey, have invented certain new and useful Improvements in Automatic Circuit-Breakers, of which the following is a specification.

My invention consists, broadly, in providing means for magnetically short-circuiting the magnetic field employed to keep the circuit closed, and thereby causing the circuit to be broken whenever the current exceeds any desired limit of strength.

In the accompanying drawing, which forms a part of my specification, the figure shows a perspective view of my invention.

The line E E includes the coil of the circuit-closing magnet A, the armature B, and the contact-brush F. The circuit is closed by moving the armature B up to the magnet and remains closed so long as the current is constant within desired limits. If the current falls below the desired lower limit, the armature B falls back and breaks the circuit. A brass or other non-magnetic adjusting-screw J prevents the armature from actually touching the magnet and permits regulation, so that it shall fall back by gravity when the current drops below any desired limit.

In order to cause the circuit to be broken when the current exceeds a definite limit, I provide a second armature C, which normally rests against an adjusting-screw D, but can be drawn up into contact with the magnet, as shown. Whenever the current exceeds a limit regulated by setting the screw D, the armature C is drawn up and short-circuits the field of force, which includes the armature B. This causes the armature B to fall back by gravity and opens the circuit.

There are a certain number of lines of force through the magnet-core and the armature B under normal conditions, but the area of the magnet-core is not sufficient to supply magnetism for both armatures B and C together. When the current increases, the armature C, which has heretofore been held off by a spring, is attracted and brought into intimate contact with the pole-pieces. As the capacity of the magnet-core will not permit the magnet to hold both armatures, it holds the one which is in most intimate contact or subject to the least mechanical retractile force—viz., armature C—and the other armature falls from lack of support.

It will be clear that many changes can be made without departing from the spirit of my invention. I do not limit myself to the number of coils on the magnet, as these may be one or several; nor do I limit myself to employing the force of gravity to operate the parts, but I may employ springs or use other desired means; nor do I limit myself to any particular construction and arrangement of the parts, for I believe my invention to be broadly novel and of great importance, because no matter how great the inrush of current, provided it exceeds the predetermined limit, the circuit-breaker is sure to act, and the greater the inrush of current the more quickly it acts.

What I claim, and desire to secure by Letters Patent, is—

The combination of a source of electric energy, a magnetic field created thereby, a circuit-breaker controlled by the magnetic field, and means for short-circuiting the field and breaking the circuit when the current exceeds a certain strength, substantially as described.

Signed by me, in New York city, this 21st day of April, 1897.

W. G. LOWRIE.

Witnesses:
 THOMAS EWING, Jr.,
 SAMUEL W. BALCH.